(12) United States Patent
Hommi et al.

(10) Patent No.: US 7,132,806 B2
(45) Date of Patent: Nov. 7, 2006

(54) MOTOR CONTROL APPARATUS AND MOTOR CONTROL METHOD

(75) Inventors: Akira Hommi, Aichi-ken (JP);
Kiyotaka Hamajima, Okazaki (JP);
Mitsuhiro Nada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/525,798

(22) PCT Filed: Jul. 7, 2003

(86) PCT No.: PCT/JP03/08594

§ 371 (c)(1),
(2), (4) Date: Feb. 25, 2005

(87) PCT Pub. No.: WO2004/022382

PCT Pub. Date: Mar. 18, 2004

(65) Prior Publication Data

US 2006/0175997 A1    Aug. 10, 2006

(30) Foreign Application Priority Data

Aug. 29, 2002   (JP) .............................. 2002-251365

(51) Int. Cl.
*B61C 15/08* (2006.01)
*B61C 15/12* (2006.01)

(52) U.S. Cl. ...................... 318/52; 318/139; 318/432; 318/434; 701/70

(58) Field of Classification Search ................ 318/52, 318/68, 93, 432–434, 700
See application file for complete search history.

(56) References Cited

U.S. PATENT DOCUMENTS 3,658,388 A * 4/1972 Hasegawa .................... 303/171

(Continued)

FOREIGN PATENT DOCUMENTS

EP         1 147 937 A2     10/2001

(Continued)

OTHER PUBLICATIONS

Supplemental European Search Report for Appln. No. EP 03 74 1239 issued May 8, 2006.

*Primary Examiner*—Lincoln Donovan
*Assistant Examiner*—Tyrone Smith
(74) *Attorney, Agent, or Firm*—Kenyon & Kenyon LLP

(57) ABSTRACT

An increase in angular acceleration α of a rotating shaft of a motor, which outputs a torque to a drive shaft linked to drive wheels, may cause a skid on the drive wheels. In response to detection of a skid, the control procedure of the invention sets a maximum torque Tmax according to a preset map representing a relation between the angular acceleration α and the maximum torque Tmax, and restricts an output torque level to the drive shaft. The map is set to decrease the maximum torque Tmax with an in crease in angular acceleration α. The restricted output torque level is restored at a zero cross timing of the angular acceleration α after a negative peak in the course of convergence of the skid. This arrangement makes the direction of the torque restored from the torque restriction identical with the direction of the angular acceleration, thus effectively reducing torsions of the drive shaft and thereby preventing potential torsional vibrations of the drive shaft.

20 Claims, 14 Drawing Sheets

U.S. PATENT DOCUMENTS

| | | | |
|---|---|---|---|
| 4,035,698 A | 7/1977 | Soderberg | |
| 4,075,538 A | 2/1978 | Plunkett | |
| 4,446,522 A * | 5/1984 | Sato et al. | 701/79 |
| 4,789,938 A * | 12/1988 | Maehata et al. | 701/76 |
| 4,799,161 A | 1/1989 | Hirotsu | |
| 4,859,002 A | 8/1989 | Yoshino | |
| 4,971,164 A * | 11/1990 | Fujita et al. | 180/197 |
| 5,134,352 A * | 7/1992 | Matsumoto et al. | 318/587 |
| 5,195,037 A * | 3/1993 | Tezuka | 701/81 |
| 5,404,302 A * | 4/1995 | Matsuda et al. | 701/71 |
| 5,898,281 A * | 4/1999 | Bossoney et al. | 318/52 |
| 6,182,003 B1 * | 1/2001 | Maier-Landgrebe | 701/84 |
| 6,338,392 B1 * | 1/2002 | Schmitt | 180/197 |
| 6,421,598 B1 * | 7/2002 | Oshiro | 701/71 |
| 6,456,920 B1 * | 9/2002 | Nishio et al. | 701/70 |
| 6,490,518 B1 * | 12/2002 | Walenty et al. | 701/71 |
| 6,612,662 B1 * | 9/2003 | Ohtsu | 303/156 |
| 6,663,196 B1 * | 12/2003 | Mueller | 303/144 |
| 6,728,621 B1 * | 4/2004 | Walenty et al. | 701/71 |
| 6,885,930 B1 * | 4/2005 | Wang | 701/70 |
| 6,895,322 B1 * | 5/2005 | Walenty et al. | 701/71 |
| 6,941,213 B1 * | 9/2005 | Yasui et al. | 701/80 |

FOREIGN PATENT DOCUMENTS

| | | |
|---|---|---|
| EP | 1541406 A1 * | 6/2005 |
| EP | 1547854 A1 * | 6/2005 |
| JP | 06-087421 | 3/1994 |
| JP | 08-182118 | 7/1996 |
| JP | 08-182119 | 7/1996 |
| JP | 2001-295676 | 10/2001 |

* cited by examiner

MOTOR CONTROL APPARATUS AND MOTOR CONTROL METHOD

This is a 371 national phase application of PCT/JP2003/008594 filed 7 Jul. 2003, claiming priority to Japanese Patent Application No. 2002-251365 filed 29 Aug. 2002, the contents of which are incorporated herein by reference.

TECHNICAL FIELD

The present invention relates to a motor control apparatus and a motor control method. More specifically the invention pertains to a motor control apparatus that controls a motor, which is mounted on a vehicle and outputs power to a drive shaft linked to drive wheels, as well as to a corresponding motor control method.

BACKGROUND ART

One proposed motor control apparatus of controlling a motor mounted on a vehicle restricts an output torque level from the motor to a drive shaft, in response to detection of wheelspin of drive wheels caused by the torque output from the motor (see, for example, Japanese Patent Laid-Open Gazette No. 2001-295676). This known motor control apparatus detects the occurrence of a skid in response to an increase in angular acceleration of the drive wheels (that is, a time variation of angular velocity) over a predetermined threshold value and lowers the output torque level from the motor. The restricted output torque level from the motor is restored, in response to detection of convergence of the skid.

In the prior art motor control apparatus, however, restoration of the restricted output torque level may cause vibrations of a rotating shaft of the motor (vibrations of a driving system). Reduction of a skid arising on the drive wheels is generally accompanied with a vibration of the angular acceleration. The vibration of the angular acceleration may be amplified by restoration of the restricted output torque level at an inadequate timing.

DISCLOSURE OF THE INVENTION

The motor control apparatus and the corresponding motor control method of the invention aim to prevent potential vibrations of a driving system in the course of skid control.

At least part of the above and the other related objects is attained by the motor control apparatus and the corresponding motor control method of the invention having the arrangements discussed below.

A first motor control apparatus of the invention controls a motor, which is mounted on a vehicle and outputs power to a drive shaft linked to drive wheels, and includes: an angular acceleration measurement module that measures an angular acceleration of either the drive shaft or a rotating shaft of the motor; a skid detection module that detects occurrence of a skid due to wheelspin of the drive wheels, in response to an increase in measured angular acceleration over a preset value; a first torque restriction control module that, in response to detection of the occurrence of a skid by the skid detection module, sets a certain torque restriction rate to restrict an output torque level for reduction of the skid and controls the motor with the restricted output torque level; and a torque restoration control module that restores the output torque level restricted by the first torque restriction control module and controls the motor with the restored output torque level at a predetermined timing when the angular acceleration measured by the angular acceleration measurement module has an increase in the course of convergence of the skid.

In response to detection of the occurrence of a skid due to wheelspin of the drive wheels with an increase in angular acceleration of the drive shaft over the preset value, the first motor control apparatus of the invention restricts the output torque level to the drive shaft for reduction of the detected skid. The restricted output torque level is restored at the predetermined timing when the angular acceleration has an increase in the course of convergence of the skid by the restriction of the output torque level. Namely the restricted output torque level is restored at the timing when the direction of the torque applied on the drive shaft in the course of restoration from the torque restriction is completely identical with the direction of the angular acceleration applied on the drive shaft. This arrangement thus effectively reduces torsions of the drive shaft in the course of restoration of the restricted output torque level and thereby prevents potential torsional vibrations of the drive shaft.

In the first motor control apparatus of the invention, the predetermined timing may represent a change timing of the measured angular acceleration from negative to positive. This arrangement more effectively prevents the potential torsional vibrations of the drive shaft.

In the first motor control apparatus of the invention, the torque restoration control module may control the motor with a lower torque restriction rate than the certain torque restriction rate set by the first torque restriction control module for a preset time period, so as to restore the restricted output torque level. This arrangement more effectively prevents the potential torsional vibrations of the drive shaft.

The first motor control apparatus of the invention may further include: a second torque restriction control module that controls the motor with setting of a specified torque restriction, when an absolute value of a first negative peak of the measured angular acceleration detected after the increase over the preset value is greater than a predetermined threshold value. The negative peak of the angular acceleration is expected to reflect a change of the road surface condition. The specified torque restriction corresponding to the change of the road surface condition for the predetermined time period desirably prevents the potential torsional vibrations of the drive shaft caused by the changing road surface condition. In the first motor control apparatus structured in this way, the second torque restriction control module may control the motor with a torque restriction rate set corresponding to the absolute value of the first negative peak as the specified torque restriction. Further, in the first motor control apparatus of the invention, the second torque restriction control module may control the motor with the setting of the specified torque restriction for a predetermined time period.

Moreover, in the first motor control apparatus of the invention, the first torque restriction control module may control the motor to have a torque variation in a preset allowable range. This arrangement desirably reduces a potential torque shock due to restriction of the output torque level to the drive shaft in response to detection of the occurrence of a skid.

A second motor control apparatus of the invention controls a motor, which is mounted on a vehicle and outputs power to a drive shaft linked to drive wheels, and includes: a skid detection module that detects occurrence of a skid due to wheelspin of the drive wheels; a torque restriction rate setting module that, in response to detection of the occurrence of a skid by the skid detection module, sets a torque restriction rate of torque output to the drive shaft corresponding to a degree of the detected skid; a torque restriction rate correction module that, when control of the motor with the set torque restriction rate makes a torque variation out of a preset allowable range, corrects the torque restriction rate to limit the torque variation in the preset allowable range; and a torque restriction control module that controls the motor, based on a power demand to the drive shaft and the set or corrected torque restriction rate.

In response to detection of the occurrence of a skid due to wheelspin of the drive wheels, the second motor control apparatus of the invention sets the torque restriction rate of torque output to the drive shaft corresponding to the degree of the detected skid. When control of the motor with the set torque restriction rate makes a torque variation out of the preset allowable range, the torque restriction rate is corrected to limit the torque variation in the preset allowable range. The motor is controlled, based on the power demand to the drive shaft and the set or corrected torque restriction rate. The torque restriction rate set corresponding to the degree of the detected skid is regulated to limit the torque variation of the motor in the preset allowable range. This arrangement thus effectively reduces a potential torque shock caused by restriction of the torque output to the drive shaft (a decrease in torque level) in response to the occurrence of a skid.

The second motor control apparatus of the invention may further include: an angular acceleration measurement module that measures an angular acceleration of either the drive shaft or a rotating shaft of the motor. In this embodiment, the skid detection module may detect the occurrence of a skid when the measured angular acceleration exceeds a predetermined threshold value, and in response to detection of the occurrence of a skid by the skid detection module, the torque restriction rate setting module may set the torque restriction rate of torque output to the drive shaft corresponding to the angular acceleration measured by the angular acceleration measurement module. Further, in the second motor control apparatus of the invention, the torque restriction rate setting module may increase the torque restriction rate with an increase in angular acceleration.

A first motor control method of the invention controls a motor, which is mounted on a vehicle and outputs power to a drive shaft linked to drive wheels, and includes the steps of: (a) measuring an angular acceleration of either the drive shaft or a rotating shaft of the motor; (b) detecting occurrence of a skid due to wheelspin of the drive wheels, in response to an increase in measured angular acceleration over a preset value; (c) in response to detection of the occurrence of a skid, setting a certain torque restriction rate to restrict an output torque level for reduction of the skid and controlling the motor with the restricted output torque level; and (d) restoring the output torque level restricted in the step (c) and controlling the motor with the restored output torque level at a predetermined timing when the angular acceleration measured in the step (a) has an increase in the course of convergence of the skid by the restriction of the output torque level.

In the first motor control method of the invention, the predetermined timing may represent a change timing of the measured angular acceleration from negative to positive.

In the first motor control method of the invention, the step (d) may control the motor with a lower torque restriction rate than the certain torque restriction rate set by the said step (c) for a preset time period, so as to restore the restricted output torque level.

The first motor control method of the invention may further include the step of: (e) controlling the motor with setting of a specified torque restriction, when an absolute value of a first negative peak of the measured angular acceleration detected after the increase over the preset value is greater than a predetermined threshold value. In the first motor control method of the invention, the step (e) may control the motor with a torque restriction rate set corresponding to the absolute value of the first negative peak as the specified torque restriction. Further, in the first motor control method of the invention, the step (e) may control the motor with the setting of the specified torque restriction for a predetermined time period.

A second motor control method of the invention controls a motor, which is mounted on a vehicle and outputs power to a drive shaft linked to drive wheels, and includes the steps of: (a) detecting occurrence of a skid due to wheelspin of the drive wheels; (b) in response to detection of the occurrence of a skid by the step (a), setting a torque restriction rate of torque output to the drive shaft corresponding to a degree of the detected skid; (c) when control of the motor with the set torque restriction rate makes a torque variation out of a preset allowable range, correcting the torque restriction rate to limit the torque variation in the preset allowable range; and (d) controlling the motor, based on a power demand to the drive shaft and the set or corrected torque restriction rate.

The second motor control method of the invention may further include the step of: (e) measuring an angular acceleration of either the drive shaft or a rotating shaft of the motor, prior to the step (a). In this embodiment, the step (a) may detect the occurrence of a skid when the angular acceleration measured by the step (e) exceeds a predetermined threshold value, and in response to detection of the occurrence of a skid by the step (a), the step (b) may set the torque restriction rate of torque output to the drive shaft corresponding to the angular acceleration measured by the step (e).

The technique of the invention is not restricted to the motor control apparatus or the corresponding motor control method discussed above, but may also be actualized by a vehicle equipped with a motor and the motor control apparatus of the invention.

BEST MODES OF CARRYING OUT THE INVENTION

Figure 1:
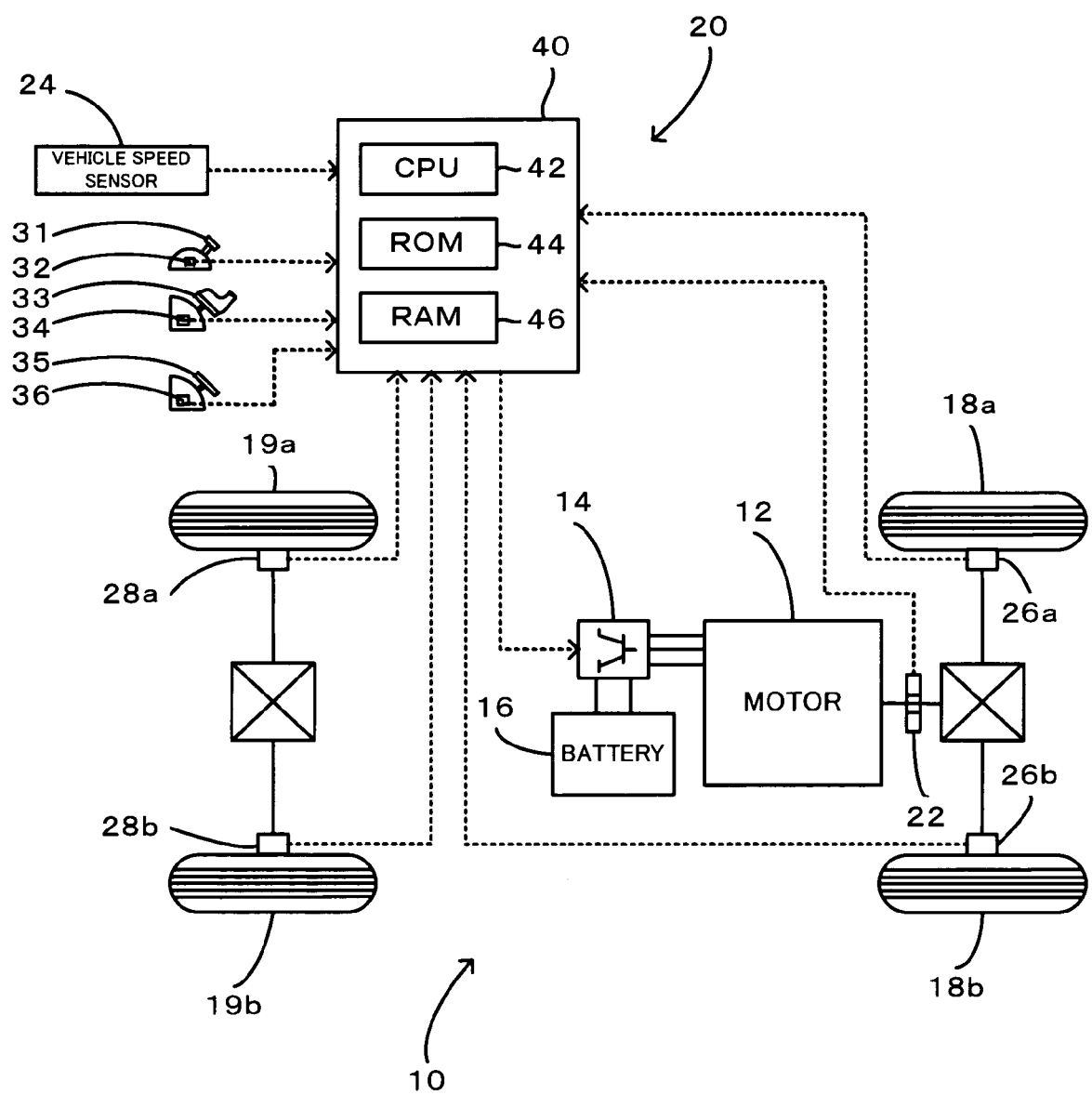
FIG. 1 schematically illustrates the configuration of an electric vehicle 10 equipped with a motor control apparatus 20 in one embodiment of the invention.

Some modes of carrying out the invention are described below as preferred embodiments. FIG. 1 schematically illustrates the configuration of an electric vehicle 10 equipped with a motor control apparatus 20 in one embodiment of the invention. As illustrated, the motor control apparatus 20 of the embodiment is constructed to drive and control a motor 12, which uses electric power supplied from a battery 16 via an inverter circuit 14 and outputs power to a drive shaft linked to drive wheels 18a, 18b of the electric vehicle 10. The motor control apparatus 20 includes a rotation angle sensor 22 that measures a rotation angle θ of a rotating shaft of the motor 12, a vehicle speed sensor 24 that measures a driving speed of the vehicle 10, wheel speed sensors 26a, 26b, 28a, and 28b that respectively measure wheel speeds of the drive wheels (front wheels) 18a and 18b and driven wheels (rear wheels) 19a and 19b driven by the drive wheels 18a and 18b, diversity of sensors that detect the driver's various operations (for example, a gearshift position sensor 32 that detects the driver' setting position of a gearshift lever 31, an accelerator pedal position sensor 34 that detects the driver's step-on amount of an accelerator pedal 33 (an accelerator opening), and a brake pedal position sensor 36 that detects the driver's step-on amount of a brake pedal 35 (a brake opening)), and an electronic control unit 40 that controls the respective constituents of the apparatus.

The motor 12 is, for example, a known synchronous motor generator that functions both as a motor and a generator. The inverter circuit 14 includes multiple switching elements that convert a supply of electric power from the battery 16 into another form of electric power suitable for actuation of the motor 12. The structures of the motor 12 and the inverter circuit 14 are well known in the art and are not the key part of this invention, thus not being described here in detail.

The electronic control unit 40 is constructed as a microprocessor including a CPU 42, a ROM 44 that stores processing programs, a RAM 46 that temporarily stores data, and input and output ports (not shown). The electronic control unit 40 receives, via the input port, the rotation angle θ of the rotating shaft of the motor 12 measured by the rotation angle sensor 22, the vehicle speed V of the vehicle 10 measured by the vehicle speed sensor 24, the wheel speeds Vf1 and Vf2 of the drive wheels 18a and 18b and the wheel speeds Vr1 and Vr2 of the driven wheels 19a and 19b measured by the wheel speed sensors 26a, 26b, 28a, and 28b, the gearshift position detected by the gearshift position sensor 32, the accelerator opening Acc detected by the accelerator pedal position sensor 34, and the brake opening detected by the brake pedal position sensor 36. The electronic control unit 40 outputs control signals, for example, switching control signals to the switching elements of the inverter circuit 14 to drive and control the motor 12, via the output port.

Figure 2:
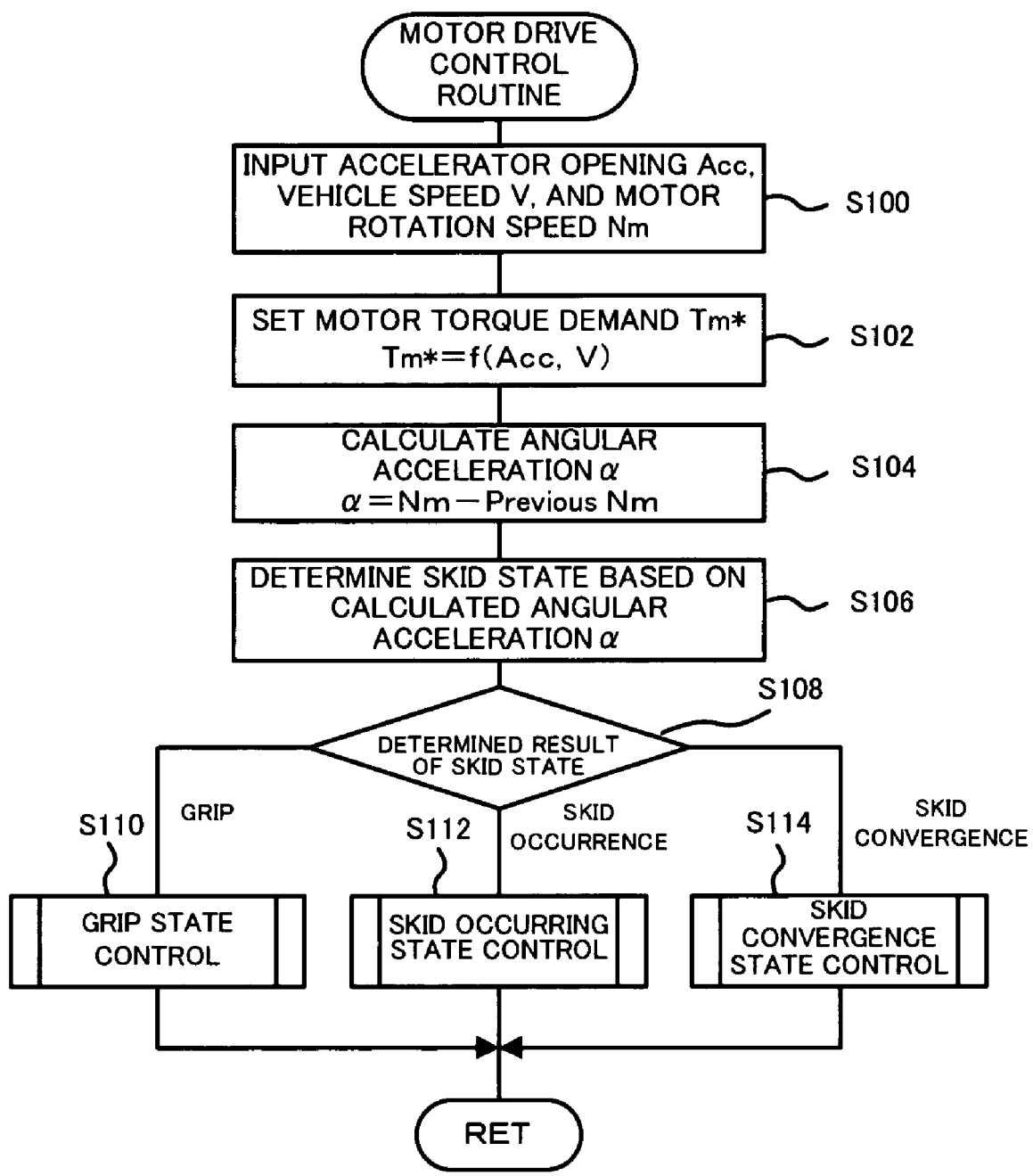
FIG. 2 is a flowchart showing a motor drive control routine executed by an electronic control unit 40 in the motor control apparatus 20 of the embodiment.

The description regards the operations of the motor control apparatus 20 constructed as discussed above, especially a series of operations of driving and controlling the motor 12 in the event of occurrence of a skid due to wheelspin of the drive wheels 18a and 18b of the vehicle 10. FIG. 2 is a flowchart showing a motor drive control routine executed by the electronic control unit 40 in the motor control apparatus 20 of the embodiment. This control routine is repeatedly executed at preset time intervals (for example, at every 8 msec).

When the motor drive control routine starts, the CPU 42 of the electronic control unit 40 first inputs the accelerator opening Acc from the accelerator pedal position sensor 34, the vehicle speed V from the vehicle speed sensor 24, wheel speeds Vf and Vr from the wheel speed sensors 26a, 26b, 28a, and 28b, and a motor rotation speed Nm calculated from the rotation angle θ measured by the rotation angle sensor 22 (step S100). In this embodiment, the wheel speeds Vf and Vr respectively represent an average of the wheel speeds Vf1 and Vf2 measured by the wheel speed sensors 26a and 26b and an average of the wheel speeds Vr1 and Vr2 measured by the wheel speed sensors 28a and 28b. The vehicle speed V is measured by the vehicle speed sensor 24 in this embodiment, but may alternatively be calculated from the wheel speeds Vf1, Vf2, Vr1, and Vr2 measured by the wheel speed sensors 26a, 26b, 28a, and 28b.

Figure 3:
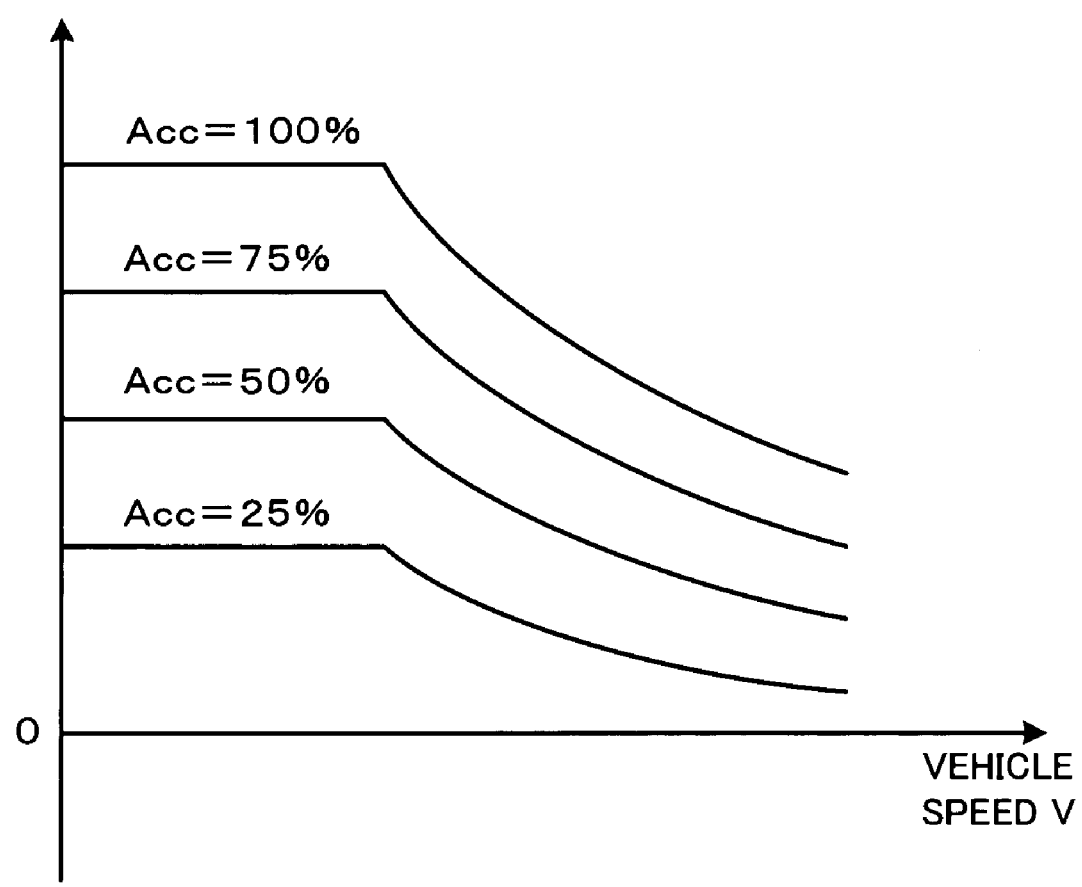
FIG. 3 is a map showing variations in motor toque demand Tm* against vehicle speed V and accelerator opening Acc.

The CPU 42 then sets a torque demand Tm* of the motor 12 according to the input accelerator opening Acc and the input vehicle speed V (step S102). A concrete procedure of setting the motor torque demand Tm* in this embodiment stores in advance variations in motor torque demand Tm* against the accelerator opening Acc and the vehicle speed V as a map in the ROM 44 and reads the motor torque demand Tm* corresponding to the given accelerator opening Acc and the given vehicle speed V from the map. One example of this map is shown in FIG. 3.

The CPU 42 subsequently calculates an angular acceleration α from the motor rotation speed Nm input at step S100 (step S104). The calculation of the angular acceleration α in this embodiment subtracts a previous rotation speed Nm input in a previous cycle of this routine from a current rotation speed Nm input in the current cycle of this routine (current rotation speed Nm−previous rotation speed Nm). The unit of the angular acceleration α is [rpm/8 msec] since the execution interval of this routine is 8 msec in this embodiment, where the rotation speed Nm is expressed by the number of rotations per minute [rpm]. Any other suitable unit may be adopted for the angular acceleration α as long as the angular acceleration α is expressible as a time variation of rotation speed. In order to minimize a potential error, the angular acceleration α may be an average of angular accelerations calculated in a preset number of cycles of this routine (for example, 3).

The CPU 42 determines a skid state of the drive wheels 18a and 18b based on the calculated angular acceleration α (step S106), and executes a required series of control according to the result of the determination (steps S110 to S114), before terminating this motor drive control routine. The determination of no occurrence of a skid (when both a skid occurrence flag F1 and a skid convergence flag F2 described below are set equal to 0) triggers grip-state control (step S110). The determination of the occurrence of a skid (when the flag F1 is set equal to 1 and the flag F2 is set equal to 0) triggers skid occurring state control (step S112) to restrict the torque level output to the drive shaft. The determination of convergence of a skid (when both the flags F1 and F2 are set equal to 1) triggers skid convergence state control (step S114) to restore the restricted torque level output to the drive shaft.

Figure 4:
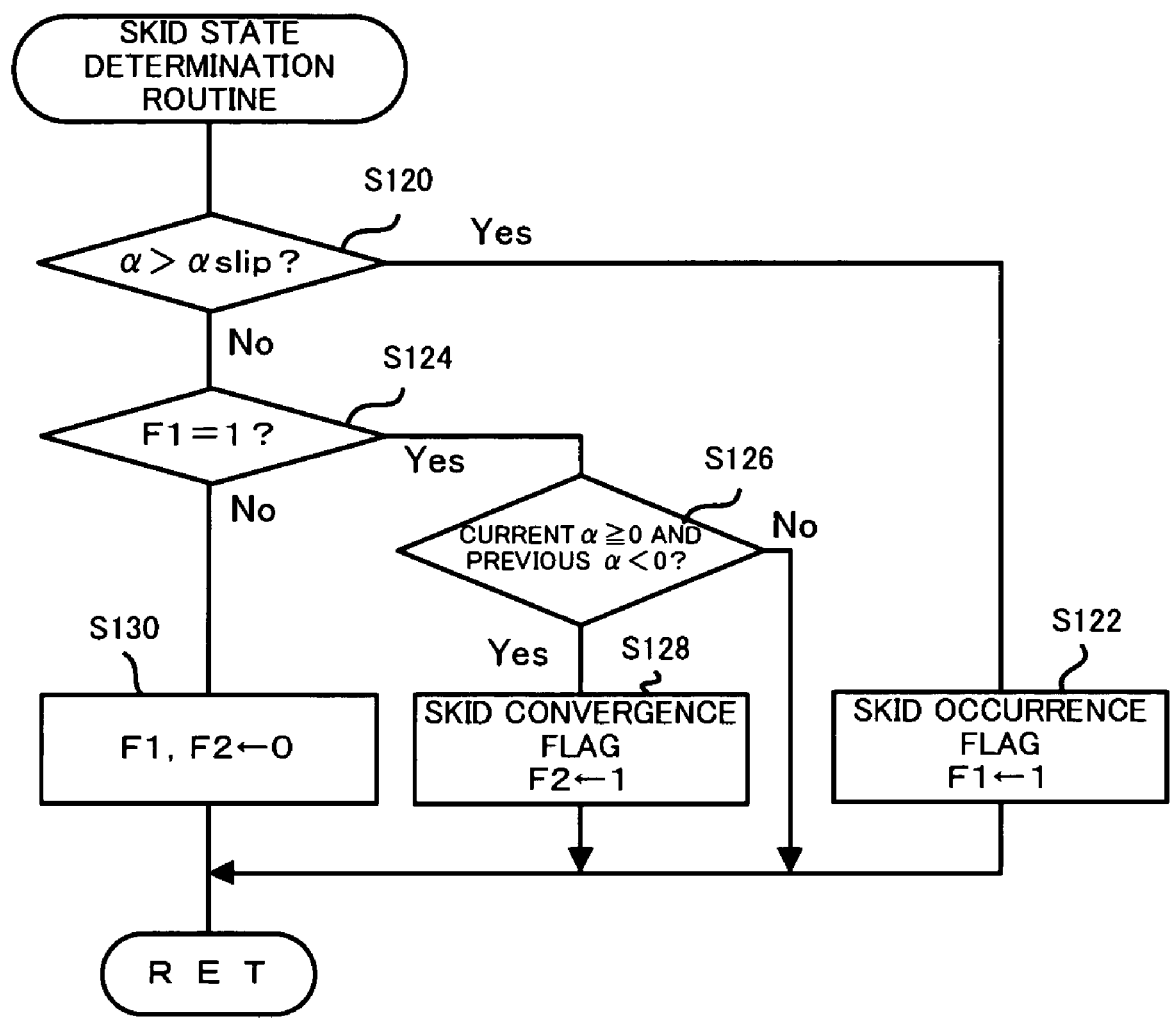
FIG. 4 is a flowchart showing a skid state determination routine executed by the electronic control unit 40 in the motor control apparatus 20 of the embodiment.

The determination of the skid state follows a skid state determination routine shown in FIG. 4. When the skid state determination routine starts, the CPU 42 of the electronic control unit 40 compares the angular acceleration $\alpha$ calculated at step S104 in the control routine of FIG. 2 with a preset threshold value $\alpha$slip, which suggests the occurrence of a skid due to wheelspin (step S120). When the calculated angular acceleration $\alpha$ exceeds the preset threshold value $\alpha$slip, the CPU 42 determines the occurrence of a skid on the wheels 18a and 18b and sets the value '1' to a skid occurrence flag F1 representing the occurrence of a skid (step S122), in order to restrict the torque level output to the drive shaft. The CPU 42 then exits from this skid state determination routine. When the calculated angular acceleration $\alpha$ does not exceed the preset threshold value $\alpha$slip, on the other hand, the CPU 42 determines whether the skid occurrence flag F1 is equal to 1 (step S124). When the skid occurrence flag F1 is equal to 1, the CPU 42 subsequently determines whether the current angular acceleration $\alpha$ is not less than 0 while the previous angular acceleration $\alpha$ in the previous cycle of this routine is less than 0, that is, whether the angular acceleration $\alpha$ rises from a negative value and passes over a zero cross point (step S126). In the case of an affirmative answer, the CPU 42 determines that the skid occurring on the drive wheels 18a and 18b is converged and that now is the adequate restoration timing of the restricted torque level output to the drive shaft and sets the value '1' to a skid convergence flag F2 (step S128). The CPU 42 then exits from this skid state determination routine.

Figure 5:
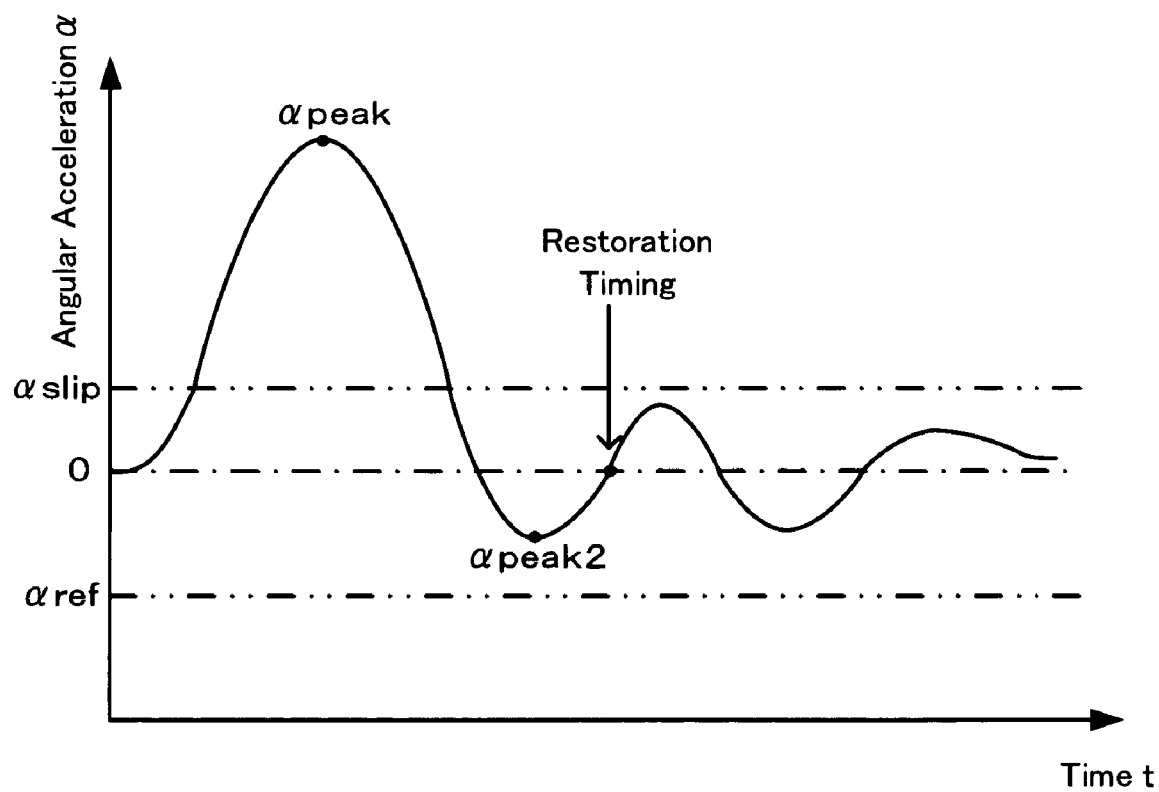
FIG. 5 shows a variation in angular acceleration α against time.

FIG. 5 shows a variation in angular acceleration $\alpha$ against time. As shown in FIG. 5, in the course of restriction of the torque level output to the drive shaft in response to the occurrence of a skid, the angular acceleration $\alpha$ first increases with elapse of time to give a positive peak, then decreases to give a negative peak, and again increases. The adequate restoration timing of the restricted torque level output to the drive shaft is a zero cross point of the angular acceleration $\alpha$ after the negative peak. The zero cross timing enables the direction of the torque applied on the drive shaft in the course of restoration from the torque restriction to be completely identical with the direction of the angular acceleration $\alpha$ applied on the drive shaft, thus preventing potential torsional vibrations of the drive shaft. In the case of a negative answer at step S126, on the other hand, the CPU 42 determines that the skid has not yet been converged or that now is not the adequate restoration timing of the restricted torque level output to the drive shaft even under the condition of convergence of the skid and terminates this skid state determination routine. When the calculated angular acceleration $\alpha$ does not exceed the preset threshold value $\alpha$slip and the skid occurrence flag F1 is not equal to 1, the CPU 42 sets both the skid occurrence flag F1 and the skid convergence flag F2 equal to 0 (step S130) and terminates this skid state determination routine. The respective controls executed according to the values of the skid occurrence flag F1 and the skid convergence flag F2 are described in detail below.

The grip state control is normal drive control of the motor 12 and drives and controls the motor 12 to ensure output of a torque corresponding to the preset torque demand Tm*.

Figure 6:
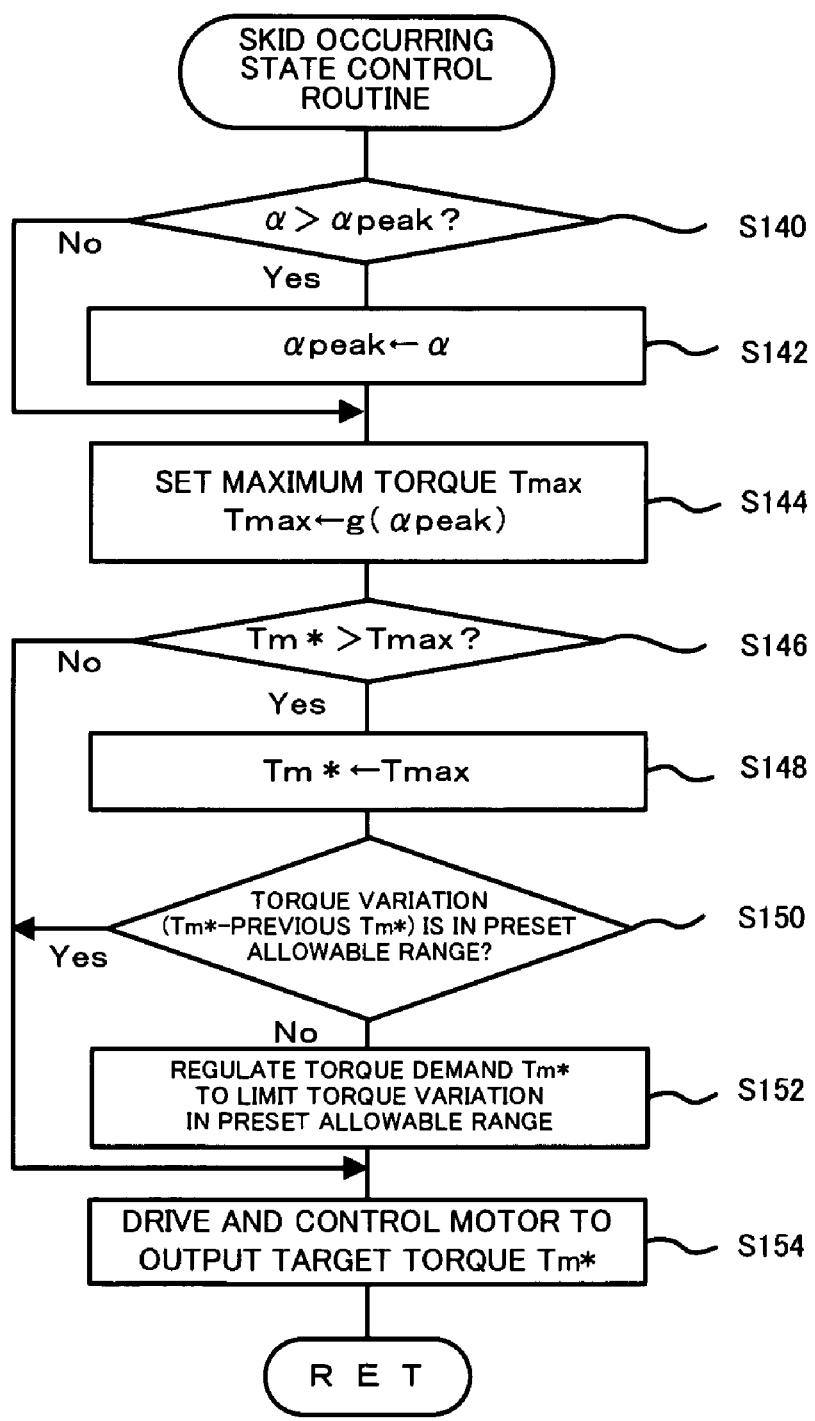
FIG. 6 is a flowchart showing a skid occurring state control routine executed by the electronic control unit 40 in the motor control apparatus 20 of the embodiment.
Figure 7:
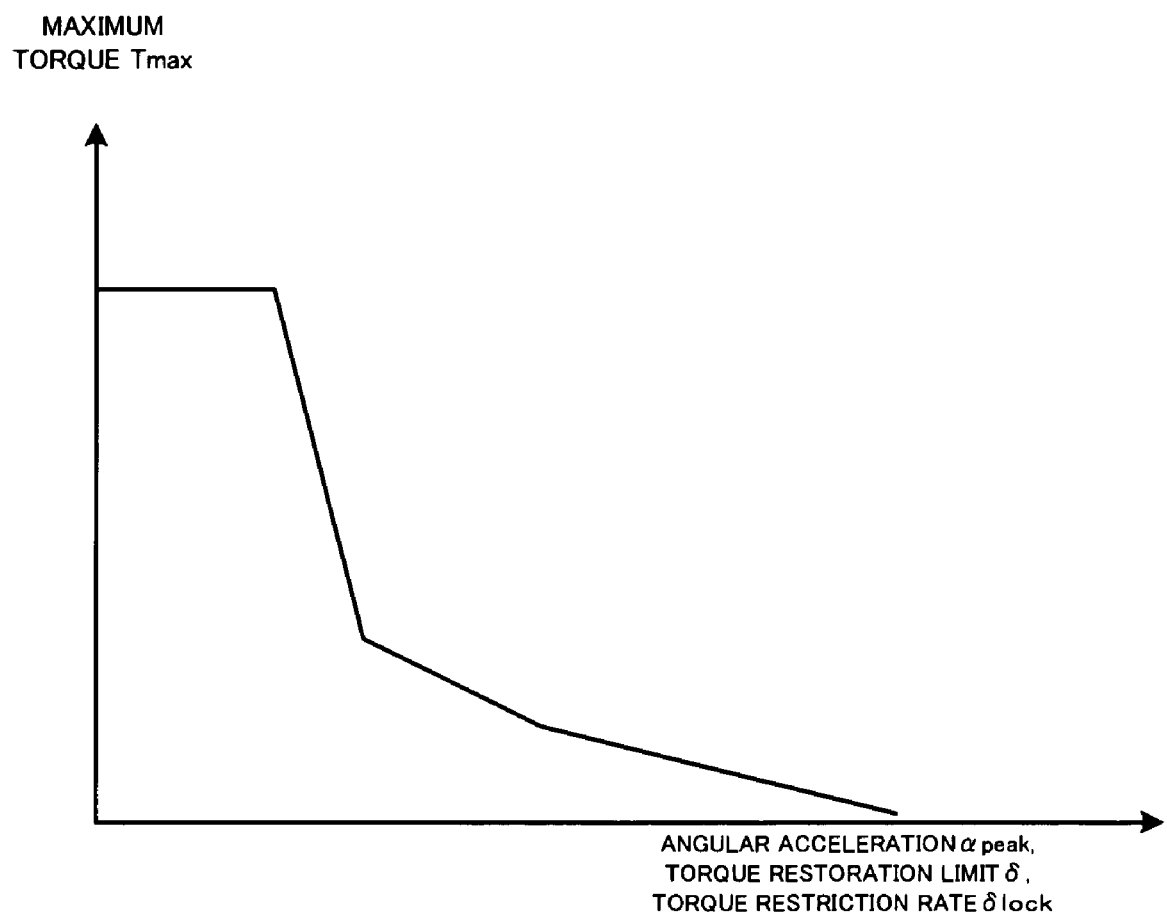
FIG. 7 is a map showing a variation in maximum torque Tmax against angular acceleration α.

The skid occurring state control drives and controls the motor 12 to lower the angular acceleration $\alpha$, which was increased by the occurrence of a skid, and follows a skid occurring state control routine of FIG. 6. The CPU 42 of the electronic control unit 40 first compares the angular acceleration $\alpha$ with a preset peak value $\alpha$peak (step S140). When the angular acceleration $\alpha$ exceeds the preset peak value $\alpha$peak, the current value of the angular acceleration $\alpha$ is newly set to the peak value $\alpha$peak (step S142). The peak value $\alpha$peak represents a peak of the angular acceleration $\alpha$ increasing due to a skid and is initially set equal to 0. Until the angular acceleration $\alpha$ increases to reach its maximum, the peak value $\alpha$peak is successively updated to the current value of the angular acceleration $\alpha$. When the increasing angular acceleration $\alpha$ reaches its maximum, the maximum value of the increasing angular acceleration $\alpha$ is fixed to the peak value $\alpha$peak. After setting the peak value $\alpha$peak, the CPU 42 sets a maximum torque Tmax as an upper limit of torque output from the motor 12 corresponding to the peak value $\alpha$peak (step S144). The procedure of this embodiment refers to a map shown in FIG. 7 to set the maximum torque Tmax. FIG. 7 shows a variation in maximum torque Tmax against the angular acceleration $\alpha$. As illustrated in this map, the maximum torque Tmax decreases with an increase in angular acceleration $\alpha$. The greater peak value $\alpha$peak with an increase in angular acceleration $\alpha$, that is, the heavier skid, sets the smaller value to the maximum torque Tmax and limits the output torque of the motor 12 to the smaller maximum torque Tmax.

After setting the maximum torque Tmax, the motor torque demand Tm* is compared with the maximum torque Tmax (step S146). When the motor torque demand Tm* exceeds the maximum torque Tmax, the motor torque demand Tm* is limited to the maximum torque Tmax (step S148). The CPU 42 then determines whether a torque restriction width (a torque variation) given as a difference between the current motor torque demand Tm* and a previous motor torque demand Tm* set in the previous cycle of this routine (Tm*−Previous Tm*) is in a preset allowable range (step S150). When the torque variation is not in the preset allowable range, the motor torque demand Tm* is regulated to limit the torque variation in the preset allowable range (step S152). Such regulation of the motor torque demand Tm* reduces a potential torque shock caused by significant restriction of the torque level output to the drive shaft in response to the occurrence of a skid. The CPU 42 then sets the motor torque demand Tm* to a target torque and drives and controls the motor 12 to output a torque corresponding to the target torque Tm* (step S154), before exiting from this skid occurring state control routine. The torque output from the motor 12 in the occurrence of a skid is limited to a lower level (that is, the maximum torque Tmax corresponding to the peak value $\alpha$peak of the angular acceleration in the map of FIG. 7) for immediate reduction of the skid. This limitation effectively reduces the skid.

The skid convergence state control drives and controls the motor 12 to restore the limited torque level, when the torque restriction by the skid occurring state control lowers the angular acceleration $\alpha$ and converges the skid. The skid convergence state control follows a skid convergence state control routine of FIG. 8. The CPU 42 of the electronic control unit 40 first inputs a torque restoration limit $\delta$ (expressed in the same unit [rpm/8 msec] as the angular acceleration) (step S160).

Figure 9:
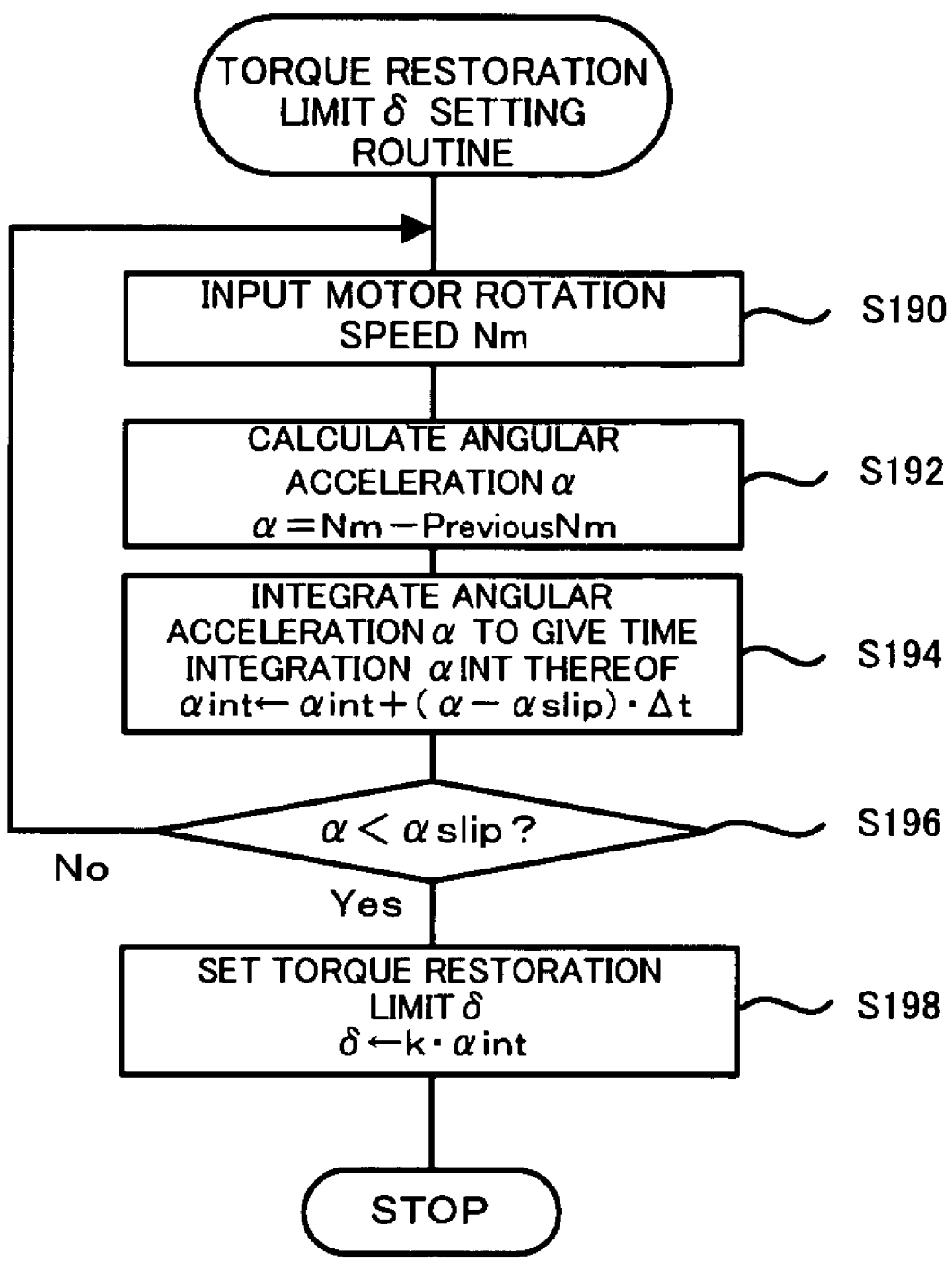
FIG. 9 is a flowchart showing a torque restoration limit δ setting routine executed by the electronic control unit 40 in the motor control apparatus 20 of the embodiment.

The torque restoration limit δ is a parameter used to set a degree of restoration from the torque restriction by increasing the maximum torque Tmax, which has been set in the skid occurring state control described above. The initial value of the torque restoration limit δ is set equal to 0. The torque restoration limit δ is set according to a torque restoration limit δ setting routine shown in FIG. 9 as discussed below. The torque restoration limit δ setting routine of FIG. 9 is executed when the skid occurrence flag F1 is set from 0 to 1 (that is, when the calculated angular acceleration α exceeds the preset threshold value αslip) at step S122 in the skid state determination routine of FIG. 4. This routine inputs the motor rotation speed Nm calculated from the rotation angle θ measured by the rotation angle sensor 22, calculates the angular acceleration α of the motor 12 from the input motor rotation speed Nm, and integrates the angular acceleration α to give a time integration αint thereof over an integration interval since the angular acceleration α exceeded the preset threshold value αslip. These input, calculation, and integration steps are repeated until the angular acceleration α decreases below the preset threshold value αslip (steps S190 to S196). In this embodiment, the time integration αint of the angular acceleration α is given by Equation (1) below, where Δt denotes a time interval of the repeated execution of steps S190 to S196 and is set equal to 8 msec in this embodiment:

$$\alpha int \leftarrow \alpha int + (\alpha - \alpha slip) \cdot \Delta t \quad (1)$$

When the angular acceleration α decreases below the preset threshold value αslip, the time integration αint of the angular acceleration a obtained by the processing of steps S190 to S196 is multiplied by a predetermined coefficient k to set the torque restoration limit δ (step S198). The torque restoration limit δ setting routine is here terminated. The concrete process of setting the torque restoration limit δ writes the value of the torque restoration limit δ into a specific area of the RAM 46.

Figure 8:
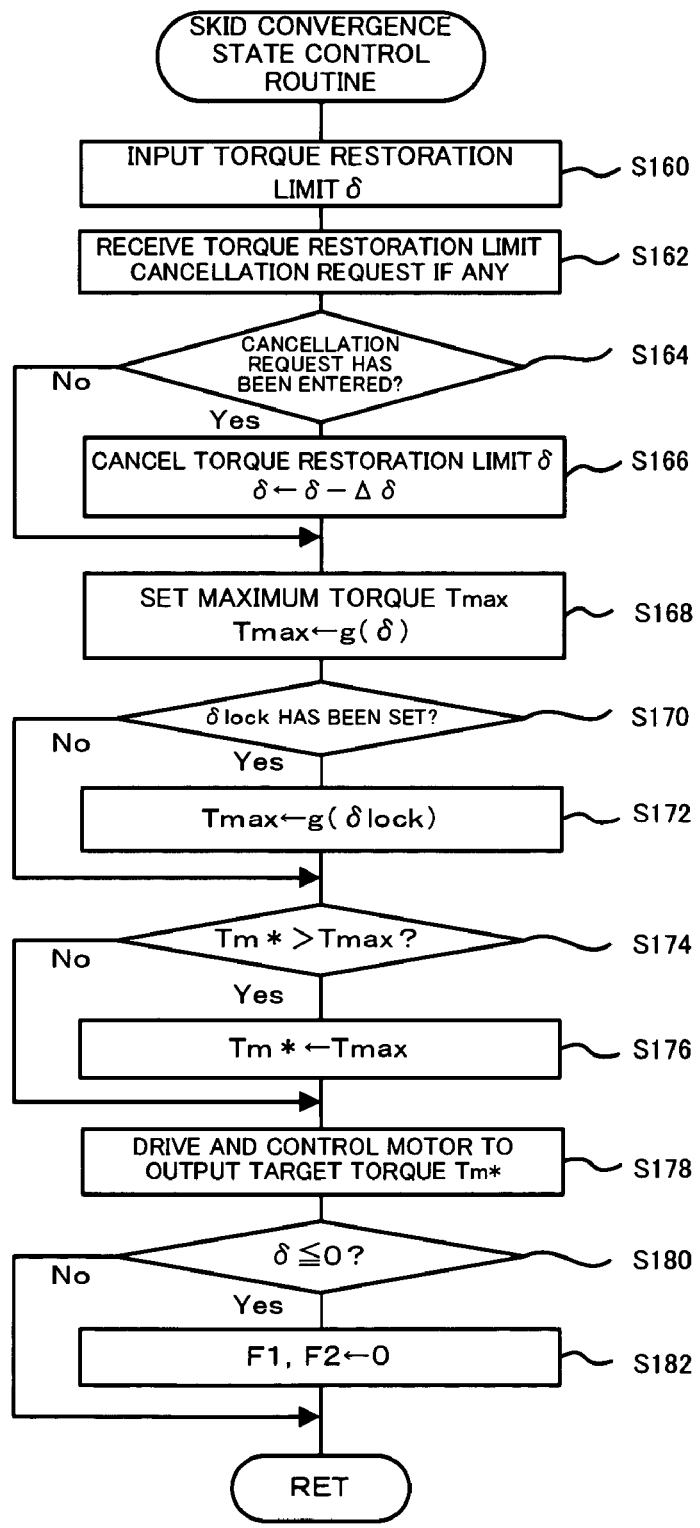
FIG. 8 is a flowchart showing a skid convergence state control routine executed by the electronic control unit 40 in the motor control apparatus 20 of the embodiment.

Referring back to the routine of FIG. 8, after input of the torque restoration limit δ at step S160, the CPU 42 inputs a cancellation request of canceling the torque restoration limit δ if any (step S162) and determines whether the cancellation request has been entered (step S164). In this embodiment, a torque restriction cancellation routine (not shown) is executed after elapse of a predetermined standby time since the start of execution of the skid convergence state control routine. The torque restriction cancellation routine sets a cancellation rate Δδ to increment from zero by a fixed value on every elapse of a preset time period. Cancellation of the torque restoration limit δ does not start until elapse of the predetermined standby time since the start of execution of the routine of FIG. 7. In the event of detection of a cancellation request, the CPU 42 subtracts the cancellation rate Δδ from the torque restoration limit δ input at step S160 to cancel the torque restoration limit δ (step S166). In the event of no detection of a cancellation request, on the other hand, the torque restoration limit δ input at step S160 is not cancelled. The CPU 42 then refers to the map of FIG. 7 and sets the maximum torque Tmax as an upper limit of torque output from the motor 12 corresponding to the torque restoration limit δ (step S168).

Figure 10:
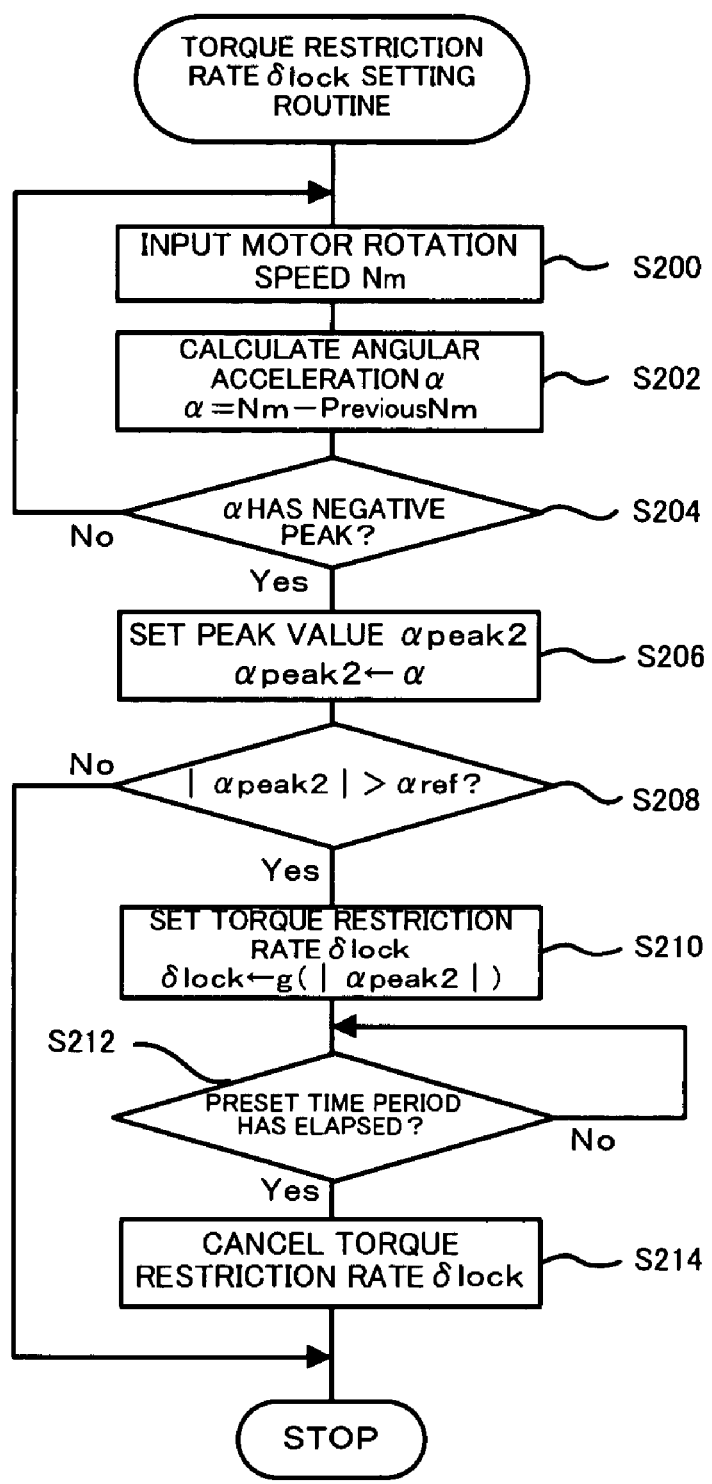
FIG. 10 is a flowchart showing a torque restriction rate δlock setting routine executed by the electronic control unit 40 in the motor control apparatus 20 of the embodiment.

The CPU 42 determines whether a torque restriction rate δlock [rpm/8 msec] has been set (step S170). Under the condition of setting the torque restriction rate δlock, the maximum torque Tmax is set corresponding to the torque restriction rate δlock by referring to the map of FIG. 7, regardless of the setting at step S168 (step S172). The torque restriction rate δlock is a parameter set to control the vibration of the drive shaft due to an abrupt negative change of the angular acceleration α, which arises when the vehicle 10 moves to a high μ road after a skid on a low μ road. The torque restriction rate δlock is set according to a torque restriction rate δlock setting routine of FIG. 10. The torque restriction rate δlock setting routine is executed when the skid occurrence flag F1 is set from 0 to 1. This routine inputs the motor rotation speed Nm calculated from the rotation angle θ measured by the rotation angle sensor 22 and calculates the angular acceleration α from the input motor rotation speed Nm. When the calculated angular acceleration α reaches a negative peak, that is, when a time difference of the angular acceleration α changes from negative to positive, the angular acceleration α at the moment is set to a negative peak value αpeak2 (steps S200 to S206). The absolute negative peak value |αpeak2| is then compared with a predetermined threshold value αref (step S208).

Figure 11:
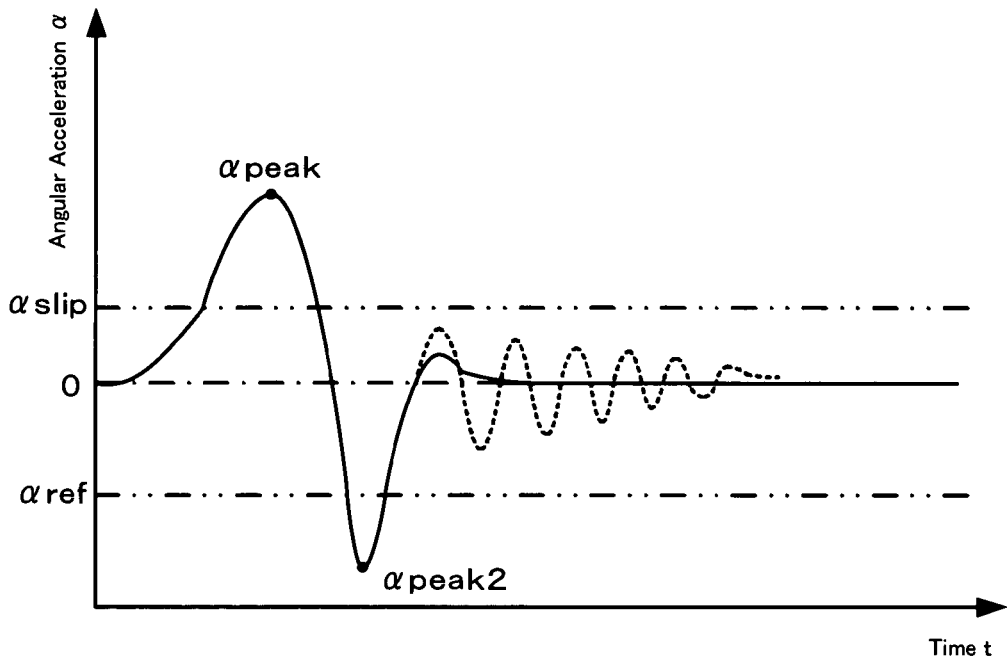
FIG. 11 shows a variation in angular acceleration α against time.

FIG. 11 shows a variation in angular acceleration α against time under the condition of a change of the road surface condition. Under the condition of no change of the road surface condition, the negative peak appearing in the course of convergence of the wheelspin of the drive wheels 18a and 18b is in a preset range as shown in FIG. 5. Under the condition of a change of the road surface condition from the low μ road to the high μ road in the presence of a skid, however, the angular acceleration α has an abrupt negative change to make the negative peak exceed the preset range. A change of the road surface condition is accordingly assumed when the absolute negative peak value |αpeak2| of the angular acceleration α exceeds the predetermined threshold value αref.

Figure 12:
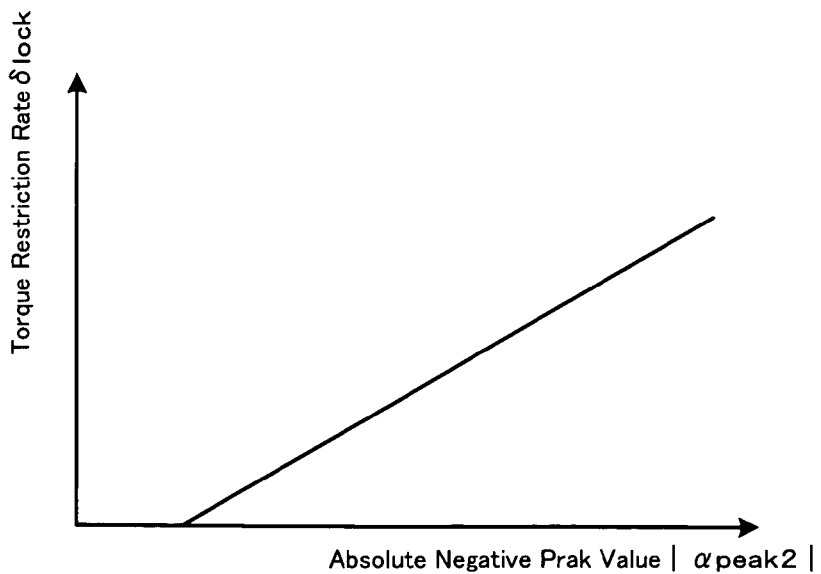
FIG. 12 is a map showing a variation in torque restriction rate δlock against the absolute negative peak value |αpeak2| of the angular acceleration α.

When the absolute negative peak value |αpeak2| exceeds the predetermined threshold value αref, the torque restriction rate δlock is set corresponding to the absolute negative peak value |αpeak2| (step S200). After elapse of a preset time period (step S202), the routine cancels the torque restriction rate δlock (step S204) and is terminated. A concrete procedure of setting the torque restriction rate δlock in this embodiment stores in advance a variation in torque restriction rate δlock against the absolute negative peak value |αpeak2| as a map in the ROM 44 and reads the torque restriction rate δlock corresponding to a given absolute negative peak value |αpeak2|. One example of this map is shown in FIG. 12. As shown in the map of FIG. 12, the torque restriction rate δlock increases with an increase in absolute negative peak value |αpeak2|. The smaller maximum torque Tmax is set against the greater torque restriction rate δlock (see FIG. 7), so that a smaller value is set to the maximum torque Tmax corresponding to the greater absolute negative peak value |αpeak2|. The torque restriction rate δlock is kept unchanged until elapse of the preset time period. The routine of FIG. 8 is repeatedly executed to effectuate the torque restriction with setting of the torque restriction rate δlock in the preset time period. The repeated execution in the preset time period effectively controls a potential vibration of the angular acceleration α (vibration of the driving system), which may arise in response to a change of the road surface condition. The preset time period may be an expected vibration convergence time measured experimentally. The solid line curve in FIG. 11 shows a time variation of the angular acceleration α under the condition of torque restriction with setting of the torque restriction rate δlock. The broken line curve shows a time variation of the angular acceleration α under the condition of no torque restriction with the torque restriction rate δlock. The procedure of this embodiment completely cancels out the setting of the torque restriction rate δlock at a time after elapse of the preset time period. One modified procedure may cancel the setting of the torque restriction rate δlock in a stepwise manner.

Referring back to the routine of FIG. 8, after setting the maximum torque Tmax, the motor torque demand Tm* is compared with the preset maximum torque Tmax (step S174). When the motor torque demand Tm* exceeds the maximum torque Tmax, the motor torque demand Tm* is limited to the maximum torque Tmax (step S176). The CPU 42 then sets the motor torque demand Tm* to a target torque and drives and controls the motor 12 to output a torque corresponding to the target torque Tm* (step S178). The CPU 42 determines whether the torque restoration limit δ1 is not greater than zero, that is, whether the torque restoration limit δ1 has been cancelled out completely (step S180). In the event of perfect cancellation of the torque restoration limit δ, both the slip occurrence flag F1 and the slip convergence flag F2 are reset to 0 (step S182).

As described above, the motor control apparatus 20 of the embodiment restricts the torque level output to the drive shaft in response to detection of a skid caused by the wheelspin of the drive wheels 18a and 18b, and restores the restricted torque level at the zero cross timing of the angular acceleration α of the rotating shaft of the motor 12 after the negative peak value αpeak 2. The torque control makes the direction of the torque completely identical with the direction of the angular acceleration. This arrangement desirably prevents potential torsional vibrations of the drive shaft and the vibration of the angular acceleration α. When the absolute negative peak value |αpeak2| of the angular acceleration α reflecting a change of the road surface condition exceeds the predetermined threshold value αref, the output torque level is restricted according to the negative peak value αpeak2. This arrangement desirably prevents potential vibrations of the drive shaft due to a change of the road surface condition.

The motor control apparatus 20 of the embodiment sets the motor torque demand Tm* to limit the torque variation in the specified allowable range, in the case where the torque variation is out of the specified allowable range in the course of restriction of the torque level output to the drive shaft in response to the occurrence of a skid due to the wheelspin of the drive wheels 18a and 18b. This arrangement effectively prevents an excess torque shock (vibration of the drive shaft), which may be caused by torque restriction in response to the occurrence of a skid.

The motor control apparatus 20 of the embodiment restores the restricted torque level at the zero cross timing of the angular acceleration α of the rotating shaft of the motor 12. The restricted torque level may be restored at any timing when the direction of the torque is identical with the direction of the angular acceleration, that is, at any timing in the course of an increase in angular acceleration α after the negative peak value αpeak2.

The motor control apparatus 20 of the embodiment specifies the allowable range of torque variation and sets the motor torque demand Tm* to limit the torque variation in the specified allowable range in the course of restriction of the torque level output from the motor 12 in response to detection of a skid. One modified procedure may set the motor torque demand Tm* without specifying the allowable range.

The motor control apparatus 20 of the embodiment reads the torque restriction rate δlock corresponding to the negative peak value αpeak2 of the angular acceleration α from the map of FIG. 12, and sets the maximum torque Tmax corresponding to the torque restriction rate δlock in the map of FIG. 7 to attain torque restriction. One modified procedure may directly set the maximum torque Tmax corresponding to the negative peak value αpeak2 of the angular acceleration α to attain torque restriction.

The motor control apparatus 20 of the embodiment may adopt a leveling technique in the process of restricting the torque level output to the drive shaft and in the process of restoring the restricted torque level output to the drive shaft. This enhances the effect of controlling the transmission of vibrations to the drive shaft.

Figure 13:
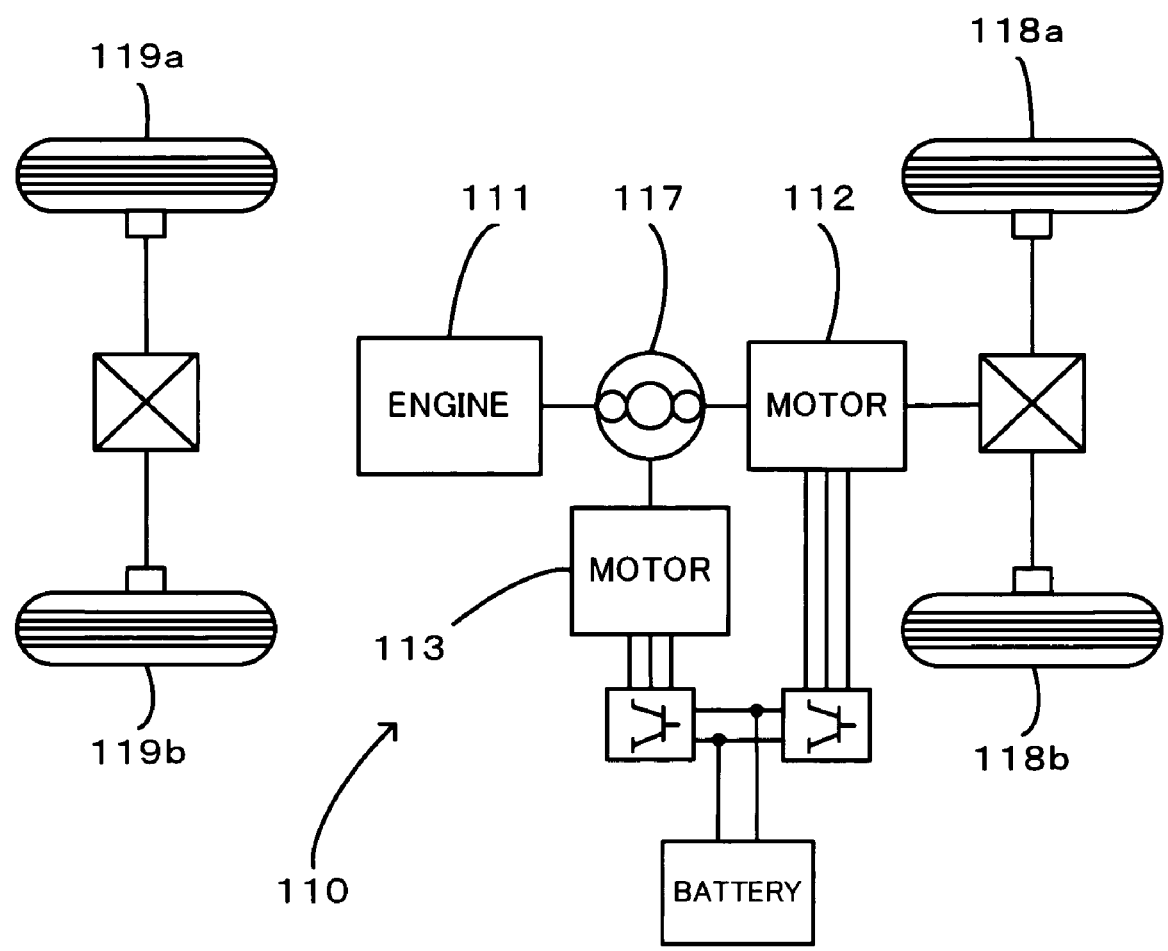
FIG. 13 schematically illustrates the configuration of a hybrid vehicle 110.
Figure 14:
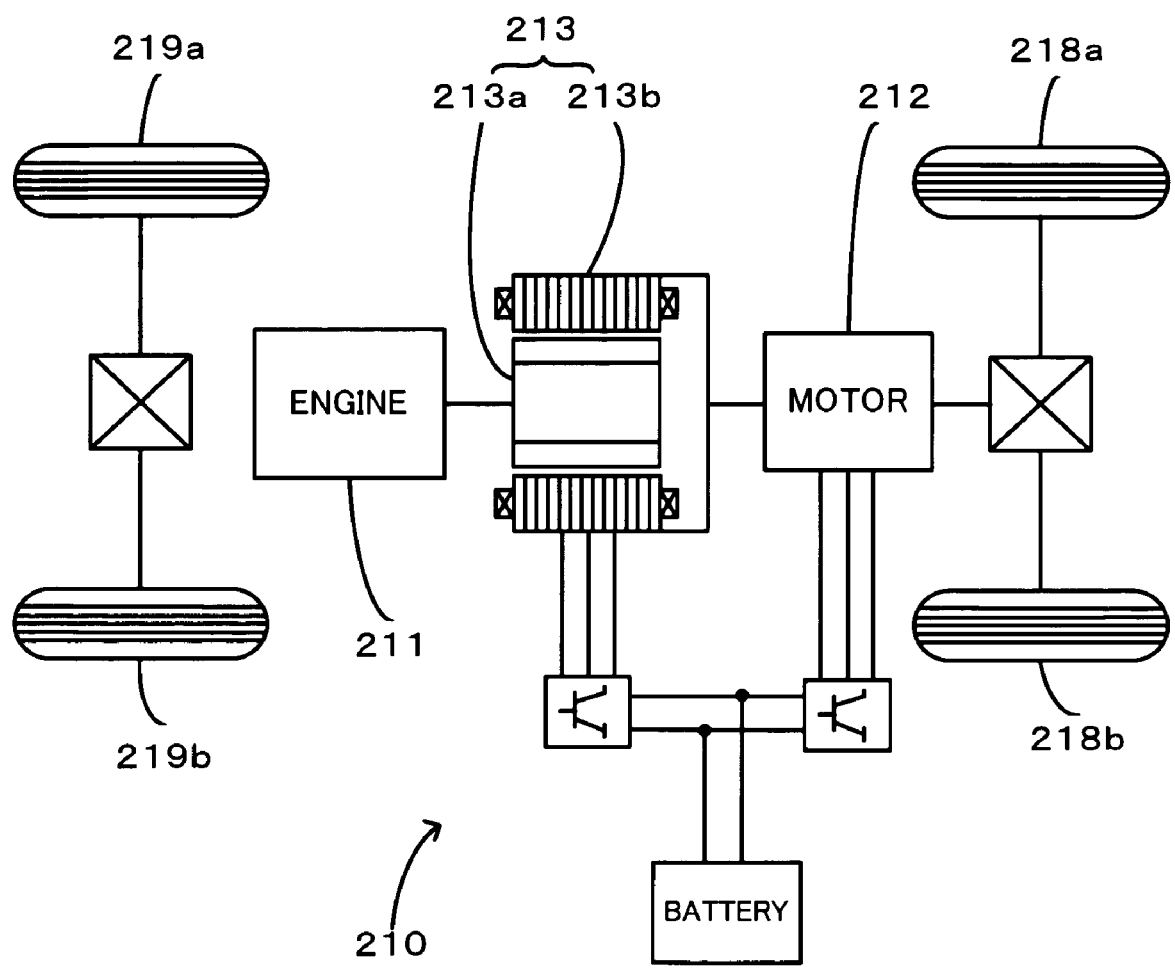
FIG. 14 schematically illustrates the configuration of a hybrid vehicle 210; and, FIG. 15 schematically illustrates the configuration of a hybrid vehicle 310.
Figure 15:
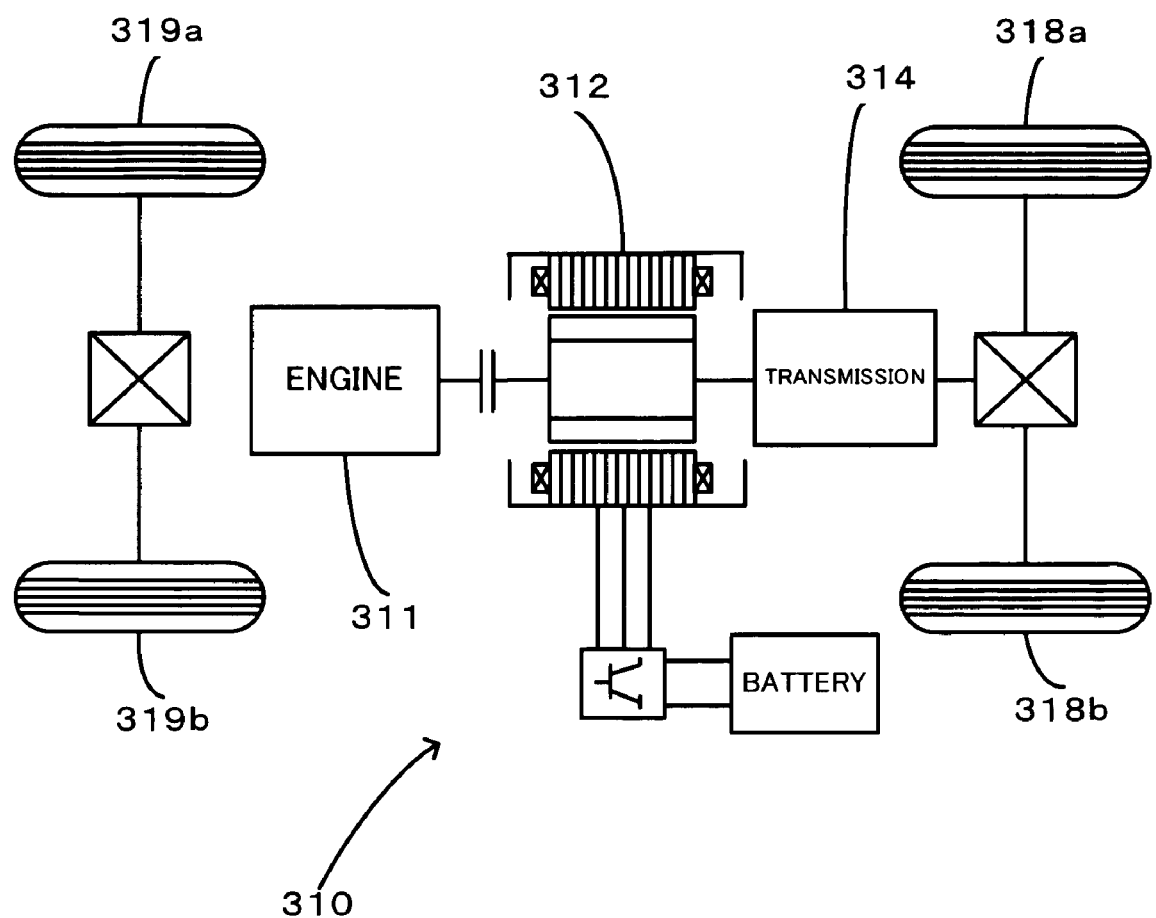

The embodiment described above regards control of the motor 12, which is mounted on the vehicle 10 and is mechanically connected with the drive shaft linked to the drive wheels 18a and 18b to directly output power to the drive shaft. The technique of the invention is applicable to a vehicle of any other structure with a motor that is capable of directly outputting power to a drive shaft. For example, one possible application of the invention is a series hybrid vehicle including an engine, a generator that is linked to an output shaft of the engine, a battery that is charged with electric power generated by the generator, and a motor that is mechanically connected with a drive shaft linked to drive wheels and is driven with a supply of electric power from the battery. Another possible application of the invention is a mechanical distribution-type hybrid vehicle 110 including an engine 111, a planetary gear 117 that is connected with the engine 111, a motor 113 that is connected with the planetary gear 117 and is capable of generating electric power, and a motor 112 that is also connected with the planetary gear 117 and is mechanically connected with a drive shaft linked to drive wheels to directly output power to the drive shaft, as shown in FIG. 13. Still another possible application of the invention is an electrical distribution-type hybrid vehicle 210 including a motor 213 that has an inner rotor 213a connected with an output shaft of an engine 211 and an outer rotor 213b connected with a drive shaft linked to drive wheels 218a and 218b and relatively rotates through electromagnetic interactions between the inner rotor 213a and the outer rotor 213b and a motor 212 that is mechanically connected with the drive shaft to directly output power to the drive shaft, as shown in FIG. 14. Another possible application of the invention is a hybrid vehicle 310 including an engine 311 that is connected with a drive shaft linked to drive wheels 318a and 318b via a transmission 314 (for example, a continuous variable transmission or an automatic transmission) and a motor 312 that is placed after the engine 311 and is connected with the drive shaft via the transmission 314 (or a motor that is directly connected with the drive shaft), as shown in FIG. 15. In the event of the occurrence of a skid on drive wheels, the torque control mainly controls the motor mechanically connected with the drive shaft, because of its high torque output response. The control of this motor may be combined with control of the other motor or with control of the engine.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is effectively applied to automobile and train-related industries.

The invention claimed is:

1. A motor control apparatus that controls a motor, which is mounted on a vehicle and outputs power to a drive shaft linked to drive wheels, said motor control apparatus comprising:

an angular acceleration measurement module that measures an angular acceleration of either the drive shaft or a rotating shaft of said motor;

a skid detection module that detects occurrence of a skid due to wheelspin of the drive wheels, in response to an increase in measured angular acceleration over a preset value;

a first torque restriction control module that, in response to detection of the occurrence of a skid by said skid detection module, sets a certain torque restriction rate to restrict an output torque level for reduction of the skid and controls said motor with the restricted output torque level; and a torque restoration control module that restores the output torque level restricted by said first torque restriction control module and controls said motor with the restored output torque level at a predetermined timing when the angular acceleration measured by said angular acceleration measurement module has an increase in the course of convergence of the skid.

2. A motor control apparatus in accordance with claim 1, wherein the predetermined timing represents a change timing of the measured angular acceleration from negative to positive.

3. A motor control apparatus in accordance with claim 1, wherein said torque restoration control module controls said motor with a lower torque restriction rate than the certain torqu restriction rate set by said first torque restriction control module for a preset time period, so as to restore the restricted output torque level.

4. A motor control apparatus in accordance with claim 1, said motor control apparatus further comprising:
a second torque restriction control module that controls said motor with setting of a specified torque restriction, when an absolute value of a first negative peak of the measured angular acceleration detected after the increase over the preset value is greater than a predetermined threshold value.

5. A motor control apparatus in accordance with claim 4, wherein said second torque restriction control module controls said motor with a torque restriction rate set corresponding to the absolute value of the first negative peak as the specified torque restriction.

6. A motor control apparatus in accordance with claim 4, wherein said second torque restriction control module controls said motor with the setting of the specified torque restriction for a predetermined time period.

7. A motor control apparatus in accordance with claim 1, wherein said first torque restriction control module controls said motor to have a torque variation in a preset allowable range.

8. A motor control apparatus that controls a motor, which is mounted on a vehicle and outputs power to a drive shaft linked to drive wheels, said motor control apparatus comprising:
a skid detection module that detects occurrence of a skid due to wheelspin of the drive wheels;
a torque restriction rate setting module that, in response to detection of the occurrence of a skid by said skid detection module, sets a torque restriction rate of torque output to the drive shaft corresponding to a degree of the detected skid;
a torque restriction rate correction module that, when control of said motor with the set torque restriction rate makes a torque variation out of a preset allowable range, corrects the torque restriction rate to limit the torque variation in the preset allowable range; and
a torque restriction control module that controls said motor, based on a power demand to the drive shaft and the set or corrected torque restriction rate.

9. A motor control apparatus in accordance with claim 8, said motor control apparatus further comprising:
an angular acceleration measurement module that measures an angular acceleration of either the drive shaft or a rotating shaft of said motor,
wherein said skid detection module detects the occurrence of a skid when the measured angular acceleration exceeds a predetermined threshold value, and
in response to detection of the occurrence of a skid by said skid detection module, said torque restriction rate setting module sets the torque restriction rate of torque output to the drive shaft corresponding to the angular acceleration measured by said angular acceleration measurement module.

10. A motor control apparatus in accordance with claim 9, wherein said torque restriction rate setting module increases the torque restriction rate with an increase in angular acceleration.

11. A vehicle, including:
a motor control apparatus that controls a motor, which is mounted on the vehicle and outputs power to a drive shaft linked to drive wheels, said motor control apparatus comprising:
an angular acceleration measurement module that measures an angular acceleration of either the drive shaft or a rotating shaft of said motor;
a skid detection module that detects occurrence of a skid due to wheelspin of the drive wheels, in response to an increase in measured angular acceleration over a preset value;
a first torque restriction control module that, in response to detection of the occurrence of a skid by said skid detection module, sets a certain torque restriction rate to restrict an output torque level for reduction of the skid and controls said motor with the restricted output torque level; and
a torque restoration control module that restores the output torque level restricted by said first torque restriction control module and controls said motor with the restored output torque level at a predetermined timing when the angular acceleration measured by said angular acceleration measurement module has an increase in the course of convergence of the skid.

12. A motor control method that controls a motor, which is mounted on a vehicle and outputs power to a drive shaft linked to drive wheels, said motor control method comprising the steps of:
(a) measuring an angular acceleration of either the drive shaft or a rotating shaft of said motor;
(b) detecting occurrence of a skid due to wheelspin of the drive wheels, in response to an increase in measured angular acceleration over a preset value;
(c) in response to detection of the occurrence of a skid, selling a certain torque restriction rate to restrict an output torque level for reduction of the skid and controlling said motor with the restricted output torque level; and
(d) restoring the output torque level restricted in said step (c) and controlling said motor with the restored output torque level at a predetermined timing when the angular acceleration measured in said step (a) has an increase in the course of convergence of the skid by the restriction of the output torque level.

13. A motor control method in accordance with claim 12, wherein the predetermined timing represents a change timing of the measured angular acceleration from negative to positive.

14. A motor control method in accordance with claim 12, wherein said step (d) controls said motor with a lower torque restriction rate than the certain torque restriction rate set by said step (C) for a preset time period, so as to restore the restricted output torque level.

15. A motor control method in accordance with claim 12, said motor control method further comprising the step of:
  (e) controlling said motor with setting of a specified torque restriction, when an absolute value of a first negative peak of the measured angular acceleration detected after the increase over the preset value is greater than a predetermined threshold value.

16. A motor control method in accordance with claim 15, wherein said step (e) controls said motor with a torque restriction rate set corresponding to the absolute value of the first negative peak as the specified torque restriction.

17. A motor control method in accordance with claim 15, wherein said step (e) controls said motor with the setting of the specified torque restriction for a predetermined time period.

18. A motor control method that controls a motor, which is mounted on a vehicle and outputs power to a drive shaft linked to drive wheels, said motor control method comprising the steps of:
  (a) detecting occurrence of a skid due to wheelspin of the drive wheels;
  (b) in response to detection of the occurrence of a skid by said step (a), setting a torque restriction rate of torque output to the drive shaft corresponding to a degree of the detected skid;
  (c) when control of said motor with the set torque restriction rate makes a torque variation out of a preset allowable range, correcting the torque restriction rate to limit the torque variation in the preset allowable range; and
  (d) controlling said motor, based on a power demand to the drive shaft and the set or corrected torque restriction rate.

19. A motor control method in accordance with claim 18, said motor control method further comprising the step of:
  (e) measuring an angular acceleration of either the drive shaft or a rotating shaft of said motor, prior to said step (a)
  wherein said step (a) detects the occurrence of a skid when the angular acceleration measured by said step (e) exceeds a predetermined threshold value, and
  in response to detection of the occurrence of a skid by said step (a), said step (b) sets the torque restriction rate of torque output to the drive shaft corresponding to the angular acceleration measured by said step (e).

20. A motor control method in accordance with claim 19, wherein said step (b) increases the torque restriction rate with an increase in angular acceleration.

* * * * *